Oct. 22, 1946.    C. C. HEETER    2,409,680
LATHE CHUCK
Filed May 11, 1943    2 Sheets-Sheet 1

INVENTOR
Colonel C. Heeter
by his attorneys
Stebbins and Blenko

Oct. 22, 1946.  C. C. HEETER  2,409,680
LATHE CHUCK
Filed May 11, 1943  2 Sheets-Sheet 2

INVENTOR
Colonel C. Heeter
by his attorneys
Stebbins and Blenko

Patented Oct. 22, 1946

2,409,680

UNITED STATES PATENT OFFICE 2,409,680

LATHE CHUCK

Colonel C. Heeter, Butler, Pa.

Application May 11, 1943, Serial No. 486,510

8 Claims. (Cl. 279—2)

This invention relates to a lathe chuck for turning the exterior or convex surface of members of generally mushroom shape, one example being the head of a naval torpedo.

The turning of mushroom-shaped members such as torpedo heads to finish the entire exterior surface thereof presents considerable difficulty. In order to finish the entire exterior surface, the member must be supported during turning by gripping it interiorly. Ordinary lathe chucks are not adapted to handle torpedo heads because of the peculiar contour thereof. The problem is further complicated by the difficulty of gaging the thickness of the member, because the chuck on which it is mounted must necessarily grip the interior and thus interferes with thickness measurements by ordinary means such as calipers. Further problems arise as a result of the considerable size and weight of torpedo heads which render them difficult to handle in placing them on a chuck and removing them therefrom.

I have invented a novel form of chuck particularly adapted for supporting a mushroom-shaped member such as a torpedo head, for a turning operation, by engagement solely with the interior thereof. In a preferred embodiment, the chuck of my invention comprises a body, preferably of cylindrical shape, adapted to be mounted on a lathe spindle, and having radial bores in which work-gripping studs are slidable. A frusto-conical expander movable axially in the chuck body serves to force the studs into engagement with the work. A centering ring slidable on the chuck body serves to position the work accurately with its axis in alinement with that of the lathe spindle. The chuck body is also provided with an adjustable gage stop adapted to be set so that the interior surface of the work has engagement with the stop at its axis.

An improved method of turning mushroom-shaped members to a predetermined thickness at their axis may easily be practiced by the aid of my improved chuck. This method contemplates positioning the work on a chuck engaging the interior thereof with the inner surface of the work at the axis thereof in engagement with a gage stop adjusted according to the desired finished thickness. With the work so chucked and positioned, I turn off the exterior surface thereof until a gage bar of predetermined length with one end positioned against a fixed abutment will just clear the member being turned at its axis. When this condition has been achieved, the member being turned will have been brought to the desired thickness at its axis, depending on the setting of the gage stop, the length of the gage bar and the position of the abutment against which the bar is positioned for measurement. All these elements being determinable, the member may be easily turned to the desired thickness, with the required accuracy.

The novel features of my invention will become apparent from the following detailed explanation and description, referring to the accompanying drawings illustrating a present preferred embodiment of my improved chuck. In the drawings, Figure 1 shows diagrammatically, in side elevation, a lathe having my chuck installed therein with a mushroom-shaped member temporarily held in position thereon by an axial spacer tube, the member and tube being shown in vertical section;

Figure 1:
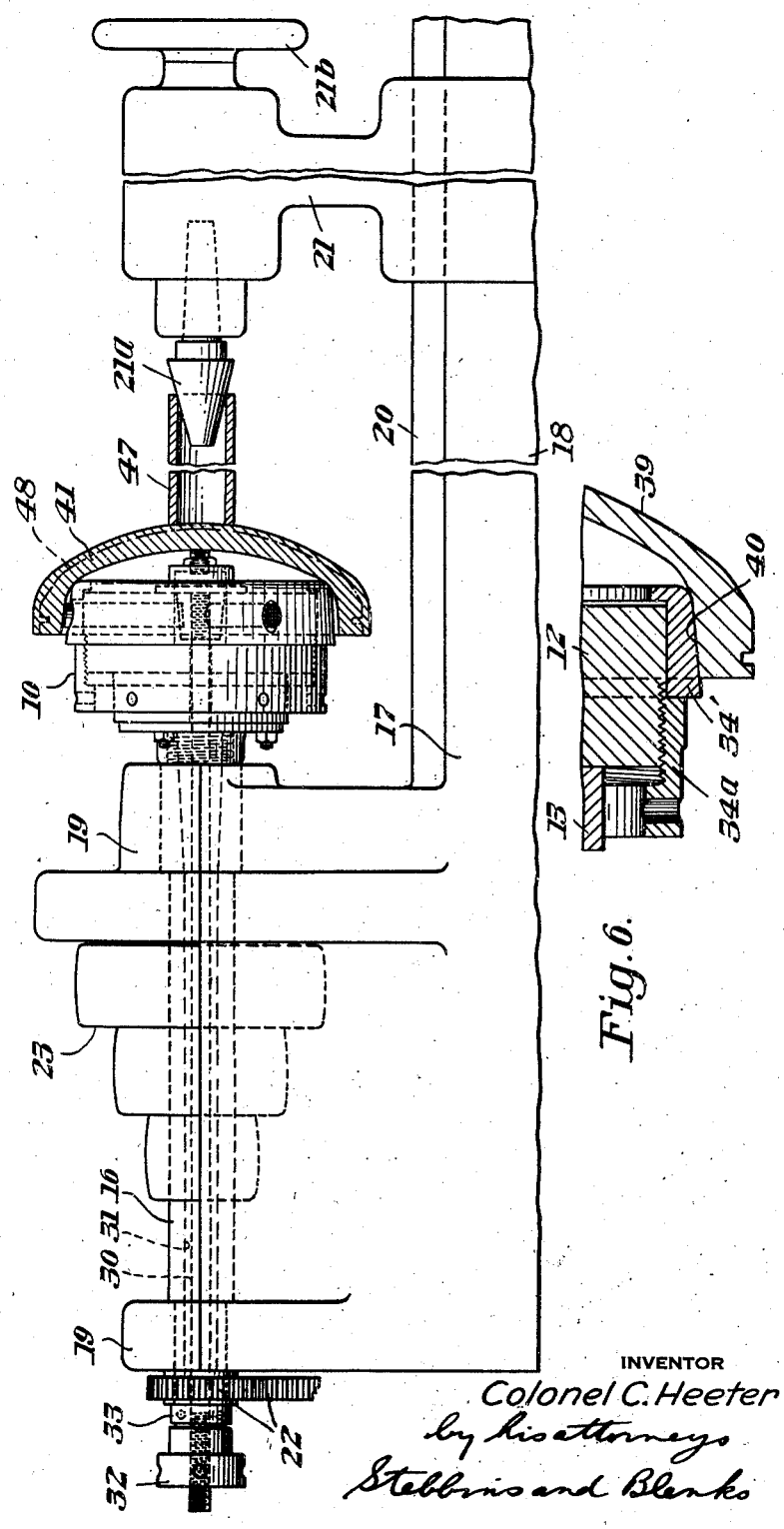

Referring now in detail to the drawings, my improved chuck indicated generally at 10 comprises a body 11, preferably of cylindrical shape, which may be of unitary construction, or, as illustrated, composed of a block 12, a disc 13 and a hub 14 secured together by through-bolts 15. The hub 14 is threaded interiorly whereby it may be screwed on to the threaded end of a lathe spindle 16. The spindle 16 forms part of a lathe 17 shown diagrammatically in Figure 1 including a bed 18, spindle bearings 19 carried thereon, ways 20, a tail stock 21 slidable thereon, and a carriage (not shown) also slidable along the ways 20 and provided with the usual cross slide and tool post. The drive for the spindle 16 includes the usual back gears (not shown) and change gears indicated at 22, for driving the lead screw of the carriage, power being applied for driving the lathe by any suitable means such as a belt engaging a cone pulley 23, or an independent driving motor.

Figure 3:
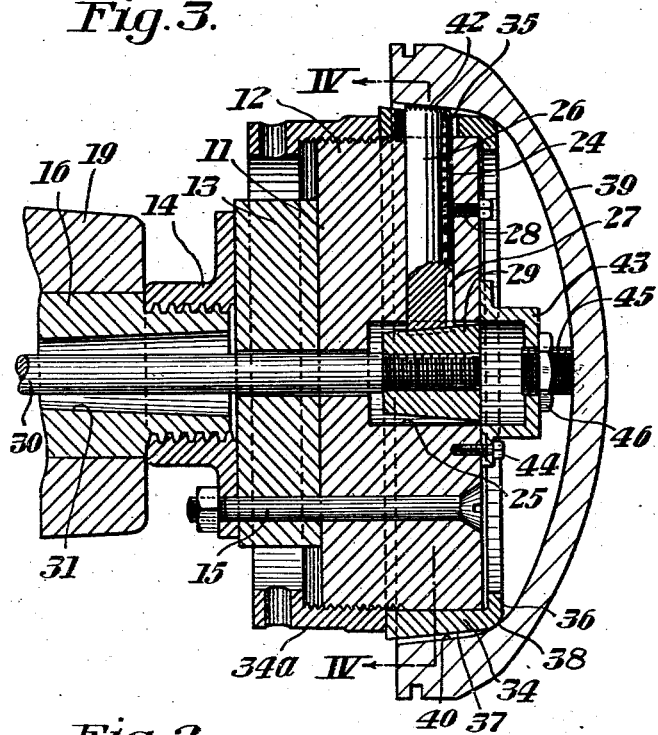
Figure 3 is an axial section through the chuck and a mushroom-shaped member such as a torpedo head, disposed thereon.
Figure 5:
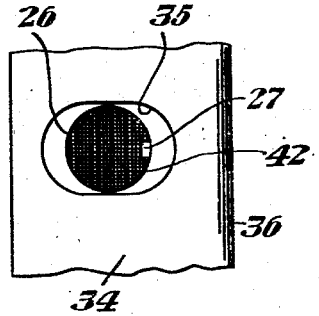
Figure 5 is a partial plan view showing a portion of the centering ring of the chuck.
Figure 2:
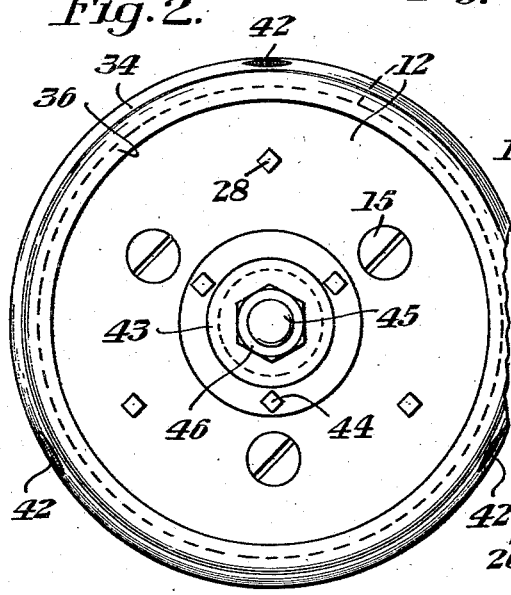
Figure 2 is an end elevation of the chuck.
Figure 4:
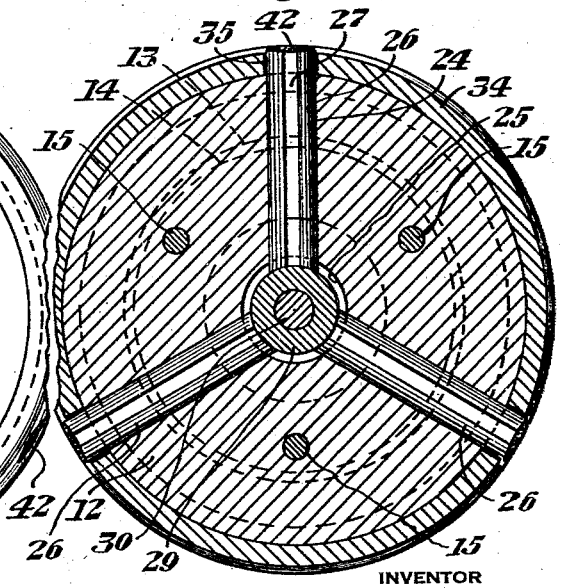
Figure 4 is a section taken transversely through the chuck, substantially along the plane of line IV—IV of Figure 3.

Referring now more particularly to Figures 2 through 4, the block 12 of the chuck body 11 has radial bores 24 spaced circumferentially thereof and intersecting an axial bore 25. Work-gripping studs 26 are slidable longitudinally in the bores 24. The studs 26 have longitudinal slots 27 machined therein and are so positioned in the bores 24 that screws 28 threaded into the outer face of the block 12 will enter the slots. The screws 28 are tightened sufficiently to cause the studs to have a light frictional engagement with the interior of the bores 24. The screws also serve to prevent rotation of the studs in their bores.

A frusto-conical expander or tapered plug 29 is disposed in the bore 25. The inner ends of the studs 26 are shaped to conform to the taper and curvature of the expander. The expander has a threaded axial hole therethrough and is carried on a threaded end of a tension bar 30 extending through the spindle 16 which has an axial bore 31 therethrough. The other end of the bar 30 projects outwardly beyond the outer end of the spindle 16 and is threaded to receive a clamping collar 32 having a threaded axial hole therethrough. An anti-friction thrust bearing 33 is disposed between the collar 32 and the end of the spindle 16. It will be apparent that the expander 29 may be drawn into the bore 25 and thus cause outward movement of the studs 26, by turning the collar 32.

A centering ring 34 is slidable axially on the periphery of the block 12 adjacent the working face of the chuck. An interiorly threaded clamping ring 34a cooperates with a threaded portion of the periphery of the block 12 spaced from the working face of the chuck, for urging the ring 34 axially away from the drive end of the lathe. The ring 34 has elongated holes 35 spaced circumferentially thereof through which the outer ends of the studs 26 pass. These elongated holes permit axial movement of the ring 34 without interference by the studs. The ring has an inturned flange 36 which limits rearward movement thereof. The exterior of the ring is tapered as at 37 and rounded as at 38 for proper engagement with the member to be turned such as a torpedo head 39 or other similar article. As clearly shown in the drawings, the head 39 is generally of mushroom shape and is finished over its entire exterior or convex surface. The interior of the head has a frusto-conical surface 40 adjacent the edge or rim. The studs 26 are adapted to engage this surface when the rough forging 41 is placed on the chuck as shown in Figure 1. In order that the studs obtain a secure grip on the interior of the forging, their outer ends have a slope corresponding to that of the inner surface 40 of the forging and are suitably roughened or toothed as shown at 42.

A flanged cylindrical cap 43 is disposed over the bore 25 in the block 12, being secured to the latter by screws 44. A gage stop 45 in the form of a threaded center stud is positioned in a threaded axial hole in the end wall of the cap and is secured in adjusted position by a lock nut 46. The stop 45, as shown in the drawings serves to position the inner surface of the forging at the axis thereof, in order that it may be turned down to a predetermined thickness measured from a fixed abutment spaced along the axis of the lathe spindle and at a point opposite the exterior or convex surface of the finished head.

In using the chuck of my invention for turning mushroom-shaped members such as torpedo heads or the like, the collars 32 and ring 34a are first backed off to permit retraction of the studs 26 and centering ring 34. Assuming that the stop 45 has been properly adjusted, the exposed end thereof is chalked so as to spot the interior of a forging when placed on the chuck to insure that the forging is in contact with the stop. A rough forging such as that shown at 41 is next disposed in alinement with the chuck. Since torpedo head forgings weigh in the neighborhood of two hundred pounds, a chain block or other form of overhead crane is preferably provided for suspending them adjacent the working face of the chuck.

With the forging suspended as described, the tail stock 21 is moved up from its normal position, to a point fairly close to the chuck and a spacer tube 47 is disposed against the outer surface of the forging and substantially coaxial therewith. The tail stock cone 21a is then advanced by the handwheel 21b to force the forging onto the chuck with its inner surface against the stop 45. When the forging has been thrust firmly onto the chuck and against the stop 45, the tail stock is reset to its normal position and the cone 21a retracted to its innermost position. The normal position of the tail stock is definitely determined by suitable index marks on the tail stock and lathe to provide a fixed point of reference for checking the thickness of the forging as it is turned down, in a manner to be explained later.

The forging 41 is then moved away from the chuck and examined to see if it has been spotted by the chalk applied to the end of the stop 45. If so, this proves that when replaced, the forging will again make contact with the stop so that the finished thickness of the piece may be determined by measuring from the end of the cone 21a of the tail stock in its normal or predetermined position. Obviously, if the inner surface of the forging is not in contact with the stop 45, the head will be reduced to a thickness less than that desired when it has been turned down to establish the proper spacing from the tail stock cone.

The forging is next replaced on the chuck and the studs 26 forced outwardly by turning down the clamping collar 32. Before the forging has been finally gripped by the studs, its axis should be accurately alined with that of the lathe spindle. The centering ring 34 is next advanced into engagement with the forging by turning the clamping ring 34a. This also tends to aline the axis of the forging with that of the spindle. When the forging has thus been properly positioned on the chuck, the studs 26 may be finally set against the inner surface of the forging under sufficient pressure to cause their ends to bite into the inner wall thereof. The forging is thus securely gripped by the chuck in proper position for turning.

After the forging has been properly chucked, the tool on the carriage is brought into proper relation for turning the forging down to the proper thickness, as indicated by the chain line 48 in Figure 1. The turning operation is continued until a gage bar of predetermined length with one end resting on the cone of the tail stock while the latter is in its predetermined position, will just clear the finished torpedo head at its axis. This indicates that the thickness of the head at its axis is that desired whereupon the head may be removed from the chuck by backing off the collar 32.

The gage stop 45 is initially adjusted by a gage bar similar to but slightly longer than that used for the finished thickness of the torpedo head. It will be apparent that the end of the stop may thus be positioned at a perdetermined distance from the fixed point of reference, i. e., the end of the tail stock cone. Thus when the forging has been turned down so that the gage bar for determining the finished thickness will clear the head, the thickness of the latter will be equal to the difference between the length of the gage bar used for adjusting the gage stop and that used for checking the finished thickness.

Figure 6:
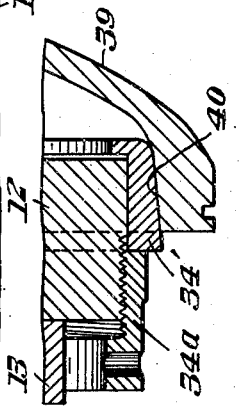
Figure 6 is a partial section similar to Figure 3 showing a modification.

It will be observed that the centering ring 34 engages the interior of the forging 39 only with it forward rounded edge and that there is a substantial clearance between the ring and forging at other points. This is advantageous in machining forgings having irregularities on their interior. For machining forgings which do not have "out-of-round" portions on their interior, I employ a modified centering ring 34' shown in Figure 6. As there illustrated, the ring 34' has engagement with the interior of the forging 39 along practically the entire frusto-conical surface. This provides a tight frictional fit of the forging on the ring. When the forging has been positioned as illustrated, the studs 26 are actuated as previously described, to force them into engagement with the interior of the forging and lock it in position on the centering ring. The operation of all the parts, in fact, is the same as has already been described, the only difference being that the ring 34', instead of merely centering the forging, actually has a frictional grip thereon because its taper conforms to that on the interior of the peripheral edge of the forging.

It will be apparent from the foregoing description and explanation that my invention provides a simple yet highly effective chuck particularly suited for turning mushroom-shaped members such as torpedo heads or the like which have to be finished over the entire exterior or convex surface. In addition, the method disclosed provides a simple yet precise determination of the compliance of the finished head with the required thickness at the axis thereof. This dimension, of course, determines the thickness at all other points depending on the comparative curvatures of the interior and exterior of the finished head.

While I have illustrated and described but a preferred embodiment of my chuck and practice of my method, it will be understood that changes in the construction and procedure described may be made without departing from the spirit of the invention or the scope of the appended claims.

I claim:

1. A lathe chuck comprising a cylinder adapted to be mounted on a lathe spindle coaxially therewith, an axial bore in said cylinder, radial bores in said cylinder intersecting said axial bore, gripping studs disposed in said radial bores and slidable longitudinally therein, a conical expander disposed in said axial bore coaxially therewith, a centering ring slidable on said cylinder, and means for advancing said ring into engagement with a workpiece carried on said studs.

2. A lathe chuck comprising a cylinder adapted to be mounted on a lathe spindle coaxially therewith, an axial bore in said cylinder, radial bores in said cylinder intersecting said axial bore, gripping studs disposed in said radial bores and slidable longitudinally therein, a conical expander disposed in said axial bore coaxially therewith, a centering ring slidable on said cylinder, and a clamping ring threaded on said cylinder for advancing said centering ring.

3. A lathe chuck comprising a cylinder adapted to be mounted on a lathe spindle coaxially therewith, an axial bore in said cylinder, radial bores in said cylinder intersecting said axial bore, gripping studs disposed in said radial bores and slidable longitudinally therein, a centering ring slidable axially on said cylinder, said ring having holes to receive said studs, and a conical expander disposed in said axial bore coaxially therewith.

4. A lathe chuck comprising a cylinder adapted to be mounted on a lathe spindle coaxially therewith, an axial bore in said cylinder, radial bores in said cylinder intersecting said axial bore, gripping studs disposed in said radial bores and slidable longitudinally therein, a conical expander disposed in said axial bore coaxially therewith, and a centering ring slidable axially on said cylinder adapted to engage the interior of a hollow article gripped by said studs, said ring having openings spaced circumferentially thereof to admit said studs and dimensioned to permit sliding movement of the ring.

5. A lathe chuck comprising a cylinder adapted to be mounted on a lathe spindle coaxially therewith, an axial bore in said cylinder, radial bores in said cylinder intersecting said axial bore, gripping studs disposed in said radial bores and slidable longitudinally therein, a conical expander disposed in said axial bore coaxially therewith, a centering ring slidable axially on said cylinder adapted to engage the interior of an article gripped by said studs, and means on said cylinder for advancing said ring.

6. A lathe chuck comprising a member adapted to be mounted on a lathe spindle coaxially therewith and having one side adapted to receive a workpiece of mushroom shape, said member having bores radiating from its axis, studs slidable in said bores adapted to engage the interior of the workpiece, said member having an axial bore, a centering ring slidable longitudinally on said member and extending axially beyond said studs, a conical expander disposed in said bore coaxially therewith, and means for advancing said ring to cause it to engage the interior of the workpiece.

7. The apparatus defined by claim 4 characterized by means urging said studs into frictional engagement with the interior of said radial bores.

8. The apparatus defined by claim 4 characterized by a gage stop on said cylinder adapted to engage the interior of the workpiece.

COLONEL C. HEETER.